(12) United States Patent
Tsai et al.

(10) Patent No.: US 12,459,223 B2
(45) Date of Patent: Nov. 4, 2025

(54) MODULAR DRUG TABLET MANUFACTURING SYSTEM

(71) Applicant: Merdury Biopharmaceutical Corporation, New Taipei (TW)

(72) Inventors: Chih-Chia Tsai, New Taipei (TW); Yung-Hsun Wu, New Taipei (TW)

(73) Assignee: Merdury Biopharmaceutical Corporation, New Taipei (TW)

( * ) Notice: Subject to any disclaimer, the term of this patent is extended or adjusted under 35 U.S.C. 154(b) by 167 days.

(21) Appl. No.: 18/234,776

(22) Filed: Aug. 16, 2023

(65) Prior Publication Data

US 2025/0001717 A1    Jan. 2, 2025

(30) Foreign Application Priority Data

Jun. 28, 2023  (TW) .................................. 112124173

(51) Int. Cl.
    *B30B 15/30*    (2006.01)
(52) U.S. Cl.
    CPC .................................. *B30B 15/302* (2013.01)
(58) Field of Classification Search
    CPC ....... B30B 15/302; B33Y 30/00; B33Y 80/00; A61J 3/06; B01F 27/706; B01F 2101/22
    See application file for complete search history.

(56) References Cited

U.S. PATENT DOCUMENTS

| | | | | |
|---|---|---|---|---|
| 3,926,335 | A | * | 12/1975 | Dangles ..................... A61J 7/04 206/533 |
| 2003/0074096 | A1 | * | 4/2003 | Das ........................ B29C 64/153 700/119 |
| 2004/0182873 | A1 | * | 9/2004 | Baum ..................... G07F 11/44 221/76 |
| 2010/0031882 | A1 | * | 2/2010 | Abe ....................... B29C 64/329 118/620 |
| 2014/0065194 | A1 | * | 3/2014 | Yoo ........................ B29C 64/106 425/375 |
| 2016/0008226 | A1 | * | 1/2016 | Hines ..................... A61J 7/0481 221/121 |
| 2018/0345541 | A1 | * | 12/2018 | Cuyt ........................ B22F 12/63 |

* cited by examiner

*Primary Examiner* — Nahida Sultana
(74) *Attorney, Agent, or Firm* — Che-Yang Chen; Law Office of Michael Chen (57) ABSTRACT

A modular drug tablet manufacturing system comprises: a machine body; at least one powder-dispensing cartridge assembled with the machine body and having a powder-dispensing accommodation space; and at least one powder storage cartridge assembled with the powder-dispensing cartridge, the powder storage cartridge has a plurality of powder storage spaces therein and a bottom of each of the powder storage spaces is respectively provided with a stored powder discharge component, the powder storage cartridge is provided with a plurality of stored powder control units therein to respectively drive a powder discharge linkage component to open or close the stored powder discharge component, and a drug powder in the powder storage space is capable of dispensing into the powder-dispensing accommodation space of the powder-dispensing cartridge to replenish the drug powder in the powder-dispensing accommodation space.

11 Claims, 6 Drawing Sheets

MODULAR DRUG TABLET MANUFACTURING SYSTEM

BACKGROUND OF THE INVENTION

Field of Invention

The invention relates to a modular drug tablet manufacturing system capable of quickly replenishing drug powder and disposing drug powder cartridges according to requirements to reduce equipment costs and improve a drug tablet production efficiency.

Related Art

With the rapid development of science and technology, the production method of pills or drug tablets has changed from the traditional method of making through molds to the combination of 3D printing technology to print and manufacture the required drug tablets. With computer-aided 3D printing technology, ordinary drug tablets are manufactured by stacking layers of drug powder in 3D printing.

Since in the existing 3D printing equipment used to print drug tablets, the drug powder must be placed in the powder collecting box, and the powder collecting box is combined with the printing equipment provided with nozzles, the powder collecting box and the printing equipment operate synchronously during processes of powder-dispensing and printing, especially during the printing process. In order to meet the requirements of printing, the printing equipment moves at a fast speed; in order to store a large amount of drug powder in the printing equipment currently available on the market, the powder collection box of the printing equipment needs to have enough powder storage space to store a large amount of drug powder, and therefore the volume of the powder collecting box needs to be large, and the weight of the powder collecting box becomes heavier, which lead to slower moving speed of the printing equipment, and poor yield of drug tablets.

Furthermore, many existing drug tablets are composed of compound ingredients, so more powder collecting boxes need to be installed to accommodate drug powder of different compositions. Therefore, the printing equipment currently available on the market needs to be provided with a large number of powder collecting boxes for drug tablets composed of compound ingredients, which will relatively increase the manufacturing cost of the printing equipment, and the powder collecting boxes cannot be replaced or disassembled to match with different types of drug powder, which lead to slower moving speed of the printing equipment, and empty powder collecting boxes.

Therefore, the inventor of the invention and relevant manufacturers engaged in this industry are eager to research and make improvement to solve the above-mentioned problems and drawbacks in the prior art.

SUMMARY OF THE INVENTION

Therefore, in order to effectively solve the above-mentioned problems, a main object of the invention is to provide a modular drug tablet manufacturing system capable of quickly replenishing drug powder and disposing drug powder cartridges according to requirements to reduce equipment costs and improve a drug tablet production efficiency.

Another object of the invention is to provide a modular drug tablet manufacturing system capable of effectively separating different types of drug powder for printing to prevent the different types of drug powder from mixing with one another to affect effects of drug tablets.

In order to achieve the above objects, the invention provides a modular drug tablet manufacturing system comprising a machine body, the machine body is provided with at least one assembling plate; and a plurality of powder-dispensing cartridges, the powder-dispensing cartridges are assembled with the assembling plate, a powder-dispensing accommodation space is formed in each of the powder-dispensing cartridges, and a powder-dispensing port is formed at a bottom of each of the powder-dispensing cartridges.

According to one embodiment of the modular drug tablet manufacturing system of the invention, further comprising at least one powder storage cartridge, the powder storage cartridge is assembled with the powder-dispensing cartridge, the powder storage cartridge has a plurality of partitions therein and a plurality of powder storage spaces are divided inside by the partitions, a bottom of each of the powder storage spaces is respectively provided with a stored powder discharge component, the powder storage cartridge is provided with a plurality of stored powder control units therein to control the stored powder discharge components respectively, the machine body is capable of driving the powder-dispensing cartridge to move to reach below the powder storage cartridge, and a drug powder in the powder storage spaces is capable of dispensing into the powder-dispensing accommodation spaces of the powder-dispensing cartridges to replenish the drug powder in the powder-dispensing accommodation spaces.

According to one embodiment of the modular drug tablet manufacturing system of the invention, wherein at least one powder discharge linkage component is further provided in the powder storage cartridge, and the stored powder control units respectively drive the powder discharge linkage components to open or close the stored powder discharge components.

According to one embodiment of the modular drug tablet manufacturing system of the invention, wherein the machine body is provided with at least one positioning component, the powder storage cartridge is provided with at least one alignment component, when the machine body drives the powder-dispensing cartridge to move to reach below the powder storage cartridge, the positioning component and the alignment component are capable of positioning with each other, so that the drug powder in the powder storage space is capable of dispensing into the powder-dispensing accommodation space of the designated powder-dispensing cartridge.

According to one embodiment of the modular drug tablet manufacturing system of the invention, wherein at least one first assembling portion is provided on a side of the assembling plate, and at least one first butting portion is provided on a side of the powder-dispensing cartridge to assemble with the first assembling portion.

According to one embodiment of the modular drug tablet manufacturing system of the invention, wherein a first guide groove is formed on a side of the first assembling portion, a first guide edge is formed on a side of the first butting portion, and the first guide edge is attached to the first guide groove.

According to one embodiment of the modular drug tablet manufacturing system of the invention, wherein at least one second assembling portion is provided on a side of the assembling plate, and at least one second butting portion is provided on a side of the powder-dispensing cartridge to assemble with the second assembling portion.

According to one embodiment of the modular drug tablet manufacturing system of the invention, wherein a second guide groove is formed on a side of the second assembling portion, a second guide edge is formed on a side of the second butting portion, the second guide edge is attached to the second guide groove, at least one butting hole is formed on the second butting portion for assembling a pull rod, and the pull rod is controlled by a control member to displace forward and backward and to assemble with or separate from the butting hole.

According to one embodiment of the modular drug tablet manufacturing system of the invention, wherein at least one stirring drive component is provided on another side of the assembling plate opposite to the powder-dispensing cartridge, the powder-dispensing cartridge is provided with at least one stirring roller in the powder-dispensing accommodation space, and the stirring roller is assembled with the stirring drive component.

According to one embodiment of the modular drug tablet manufacturing system of the invention, wherein at least one powder-dispensing drive component is provided on another side of the assembling plate opposite to the powder-dispensing cartridge, the powder-dispensing cartridge is provided with at least one powder-dispensing roller in the powder-dispensing accommodation space, the powder-dispensing roller is assembled with the powder-dispensing drive component, and the powder-dispensing roller is disposed in front of the powder-dispensing port.

According to one embodiment of the modular drug tablet manufacturing system of the invention, wherein the powder storage cartridge is further provided with at least one stored powder spacer on a side of the stored powder discharge component, at least one powder-dispensing gate component is disposed on a top of the powder-dispensing accommodation space of the powder-dispensing cartridge, and a side of the powder-dispensing gate component is further provided with at least one powder-dispensing spacer.

According to one embodiment of the modular drug tablet manufacturing system of the invention, wherein a powder pressing component is disposed on a front side of the machine body, and the powder pressing component is disposed at a position of the powder-dispensing port.

DETAILED DESCRIPTION OF THE INVENTION

The above objects of the invention, as well as its structural and functional features, will be described in accordance with the preferred embodiments of the accompanying drawings.

In the following, for the formation and technical content related to a modular drug tablet manufacturing system of the invention, various applicable examples are exemplified and explained in detail with reference to the accompanying drawings; however, the invention is of course not limited to the enumerated embodiments, drawings, or detailed descriptions.

Furthermore, those who are familiar with this technology should also understand that the enumerated embodiments and accompanying drawings are merely used for reference and explanation, and are not used to limit the invention; other modifications or alterations that can be easily implemented based on the detailed descriptions of the invention are also deemed to be within the scope without departing from the spirit or intention thereof as defined by the appended claims and their legal equivalents.

And, the directional terms mentioned in the following embodiments, for example: "above", "below", "left", "right", "front", "rear", etc., are only directions referring in the accompanying drawings. Therefore, the directional terms are used to illustrate rather than limit the invention. In addition, in the following embodiments, the same or similar elements will be labeled with the same or similar numbers.

Figure 1:
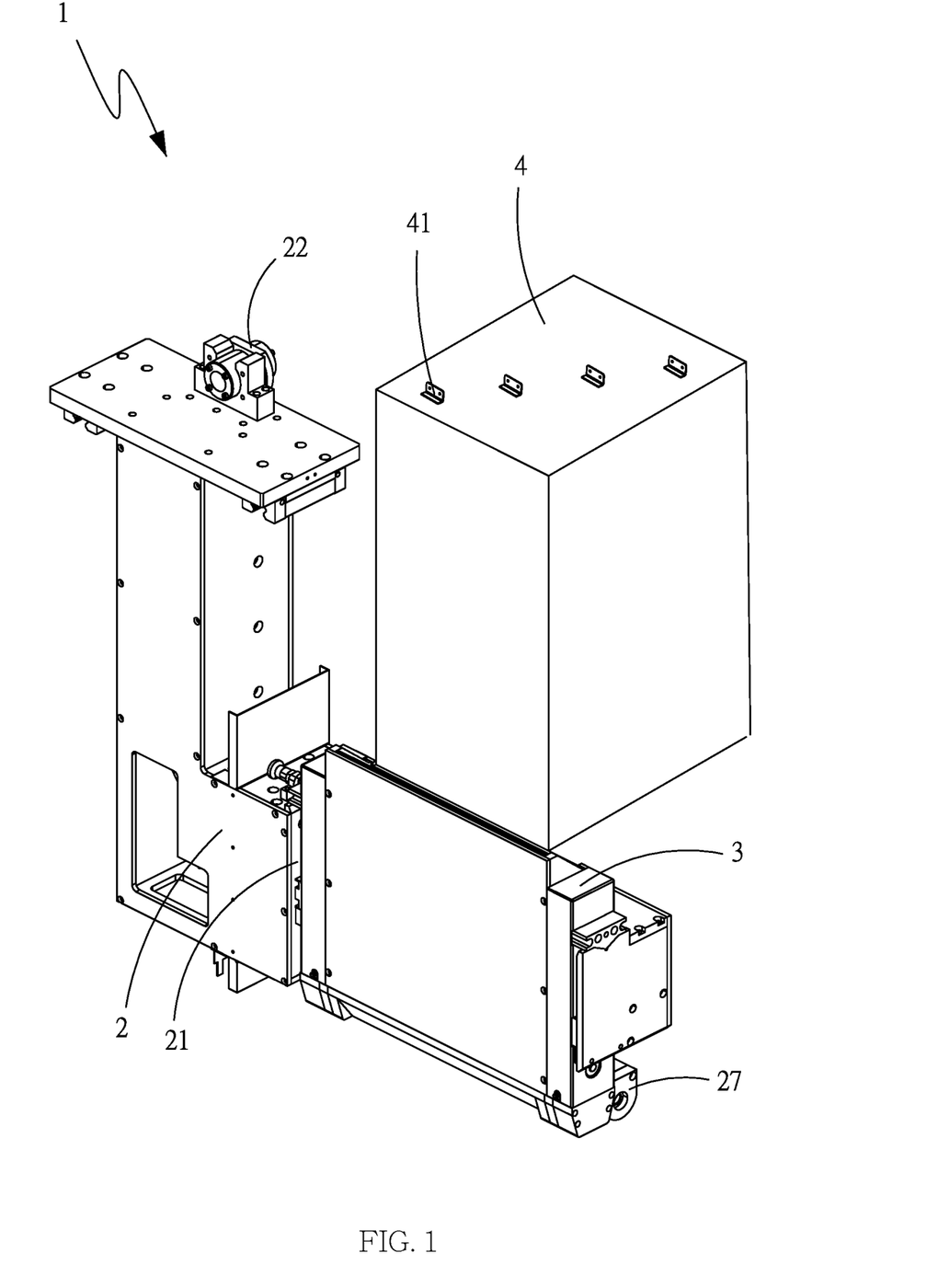
FIG. 1 is a perspective view of a modular drug tablet manufacturing system of the invention.

First of all, please refer to FIG. 1 for a perspective view of a modular drug tablet manufacturing system of the invention. It can be clearly seen from the figure that a modular drug tablet manufacturing system 1 comprises a machine body 2, at least one powder-dispensing cartridge 3 and at least one powder storage cartridge 4.

Wherein the machine body 2 is a 3D pharmaceutical printing device, and at least one assembling plate 21 is disposed on the machine body 2. In this embodiment, the machine body 2 is provided with the two assembling plates 21, one of the assembling plates 21 is disposed at a center of the machine body 2, the other assembling plate 21 is disposed on a side of the machine body 2, and the powder-dispensing cartridge 3 is disposed on the machine body 2. In this embodiment, the powder-dispensing cartridge 3 is disposed between the two assembling plates 21, and two sides of the powder-dispensing cartridge 3 are respectively assembled with the two assembling plates 21. The powder storage cartridge 4 is assembled with the powder-dispensing cartridge 3 during use, wherein the powder storage cartridge 4 can be disposed at a position above the powder-dispensing cartridge 3, or the powder storage cartridge 4 can be disposed horizontally with the powder-dispensing cartridge 3.

Figure 2:
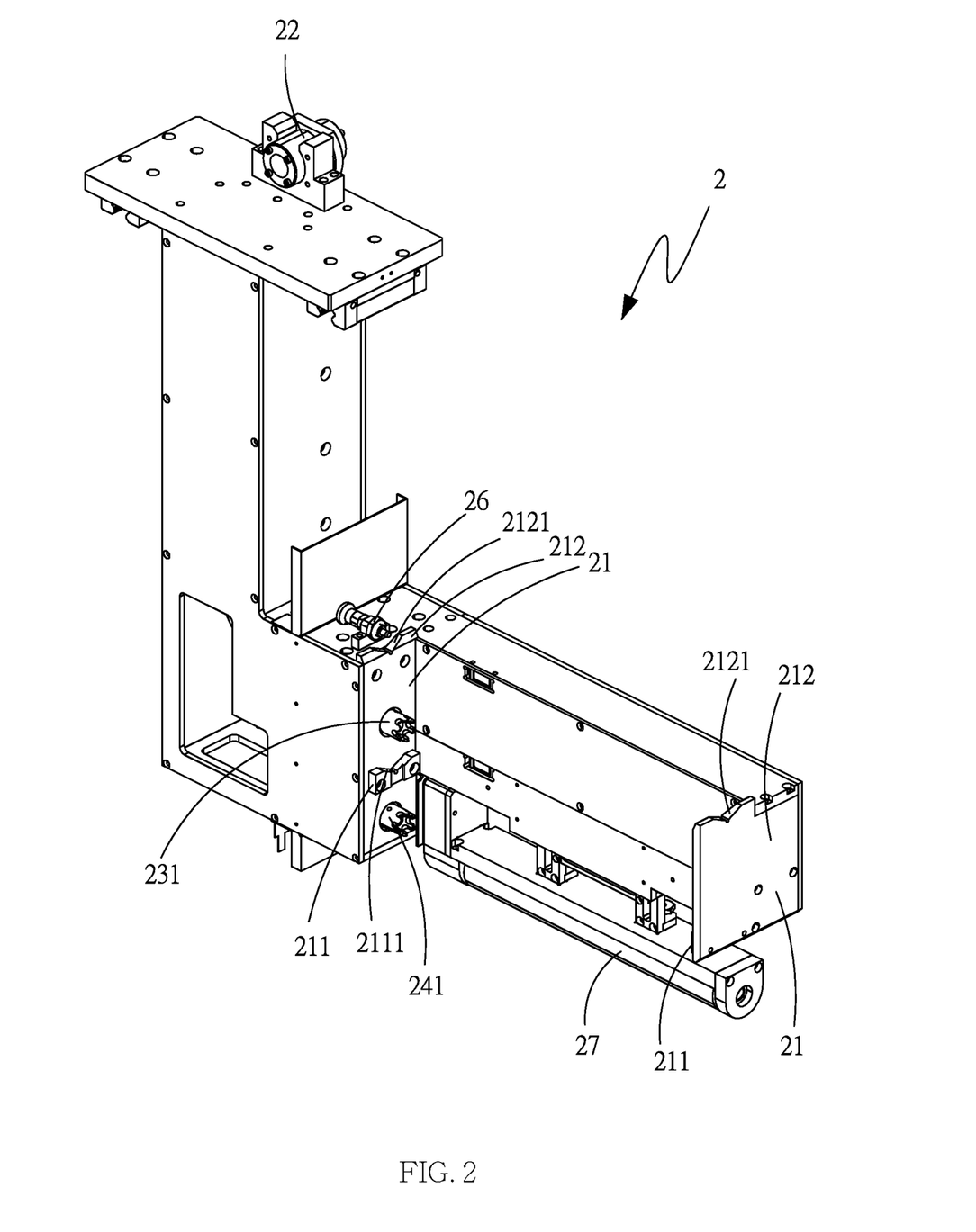
FIG. 2 is a perspective view of a machine body of the modular drug tablet manufacturing system of the invention.

Please refer to FIG. 2 for a perspective view of the machine body of the modular drug tablet manufacturing system of the invention, wherein at least one positioning component 22 is disposed on the machine body 2, and the positioning component 22 can be used for mechanism positioning or can be an infrared ray transmitter. In addition, at least one first assembling portion 211 and at least one second assembling portion 212 are provided on the assembling plates 21 of the machine body 2. In this embodiment, the assembling plate 21 is provided with the first assembling portion 211 and the second assembling portion 212 on one side opposite to the other assembling plate 21, the other assembling plate 21 is provided with the first assembling portion 211 and the second assembling portion 212 on one side opposite to the central assembling plate 21. A first guide groove 2111 is formed on the first assembling portion 211, a second guide groove 2121 is formed on the second assembling portion 212, and the first guide groove 2111 and the second guide groove 2121 are V-shaped grooves. At least one stirring drive component 23 and at least one powder-dispensing drive component 24 are provided on another side of the assembling plate 21 at a center position of the machine body 2 opposite to the powder-dispensing cartridge 3. The machine body 2 is provided with a control member 25 (as shown in FIG. 3) and a pull rod 26 connected with the control member 25, and a powder pressing component 27 is provided on a front side of the machine body 2 and below the powder-dispensing cartridge 3.

Figure 3:
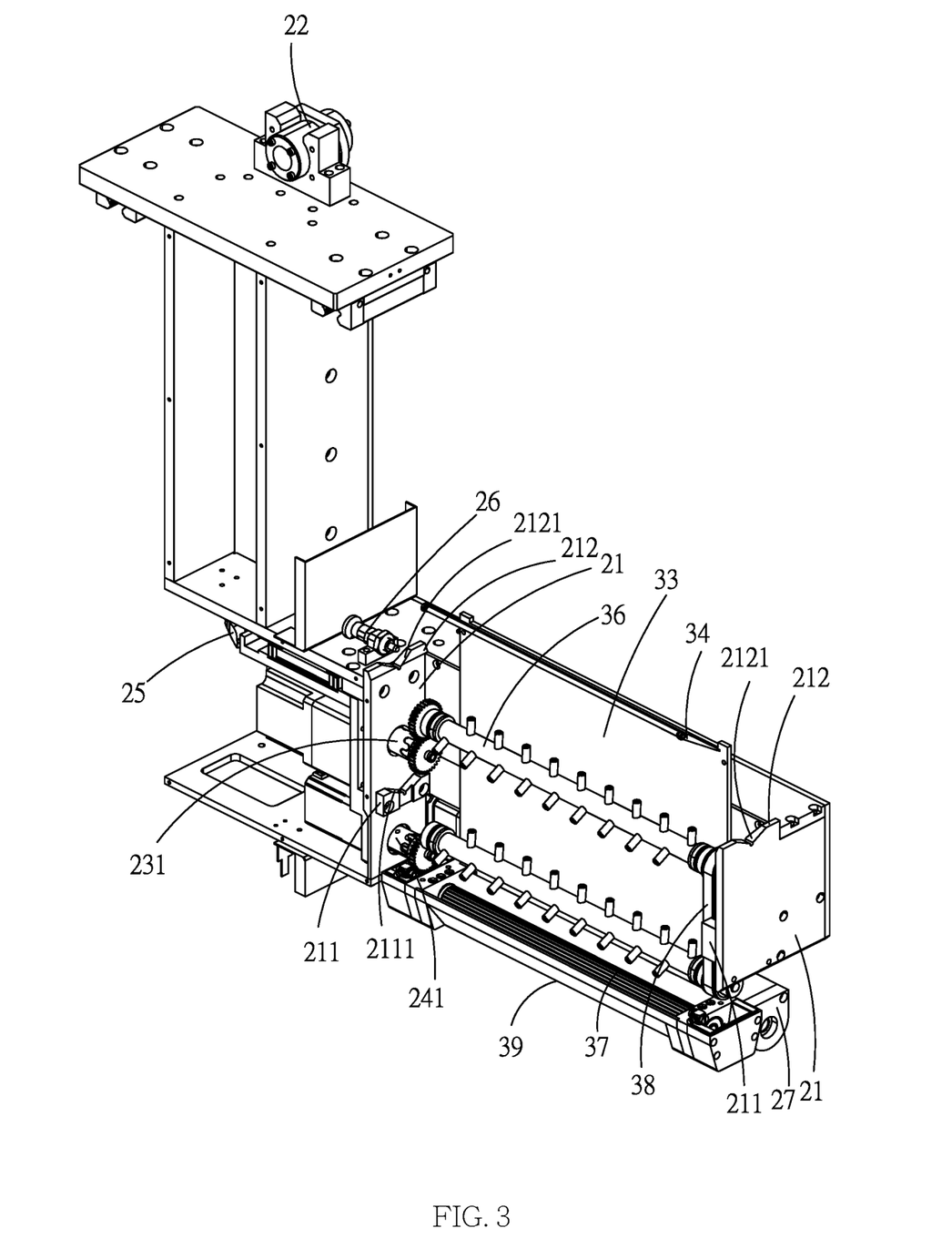
FIG. 3 is a partial perspective view of the machine body and a powder-dispensing cartridge of the modular drug tablet manufacturing system of the invention.
Figure 4:
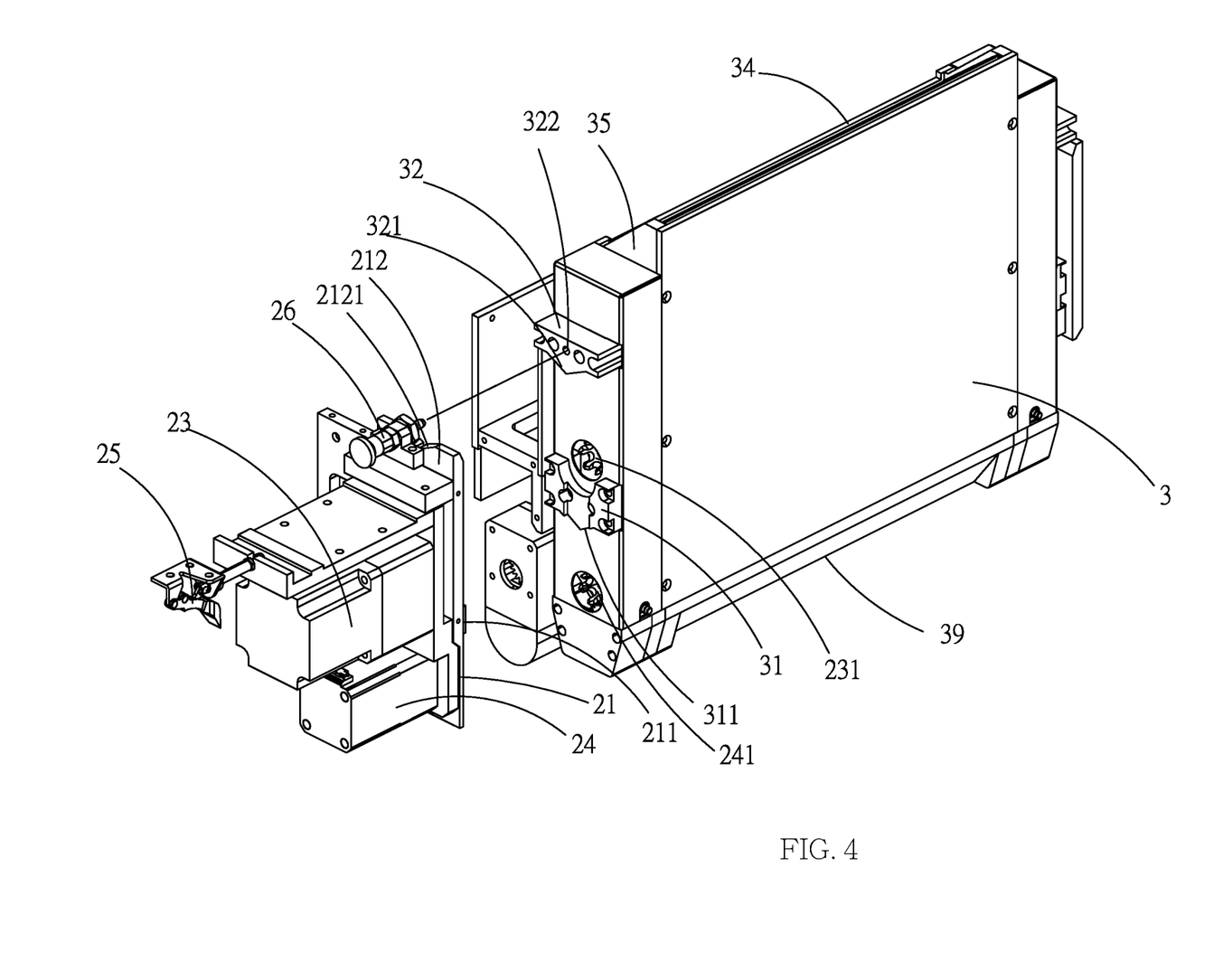
FIG. 4 is a partial exploded perspective view of the machine body and the powder-dispensing cartridge of the modular drug tablet manufacturing system of the invention.

Please refer to FIG. 3 and FIG. 4 for a partial perspective view and a partial exploded perspective view of the machine body and the powder-dispensing cartridge of the modular drug tablet manufacturing system of the invention respectively, wherein the powder-dispensing cartridge 3 is assembled with the assembling plates 21, and each of two sides of the powder-dispensing cartridge 3 is respectively assembled with the assembling plate 21 correspondingly. Therefore, in this embodiment, the two sides of the powder-dispensing cartridge 3 are respectively provided with at least one first butting portion 31 and at least one second butting portion 32, the first butting portion 31 is assembled with the first assembling portion 211, and the second butting portion 32 is assembled with the second assembling portion 212. A first guide edge 311 is formed on a side of the first butting portion 31, and the first guide edge 311 is attached to the first guide groove 2111, so that the first butting portion 31 is capable of assembling with the first assembling portion 211. In addition, the second butting portion 32 is formed with a second guide edge 321, and the second guide edge 321 is attached to the second guide groove 2121, so that the second butting portion 32 is capable of assembling with the second assembling portion 212. At least one butting hole 322 is formed on the second butting portion 32, the butting hole 322 is assembled with the pull rod 26, and the pull rod 26 is controlled by the control member 25 to displace forward and backward and to assemble with or separate from the butting hole 322.

Wherein a powder-dispensing accommodation space 33 is formed inside the powder-dispensing cartridge 3, at least one powder-dispensing gate component 34 is disposed on a top of the powder-dispensing accommodation space 33 of the powder-dispensing cartridge 3, a side of the powder-dispensing gate component 34 is further provided with at least one powder-dispensing spacer 35, and the powder-dispensing spacer 35 is a powder-dispensing baffle. The powder-dispensing cartridge 3 is provided with at least one stirring roller 36 and at least one powder-dispensing roller 37 in the powder-dispensing accommodation space 33. In this embodiment, the two stirring rollers 36 are disposed in the powder-dispensing accommodation space 33, and one end of the upper stirring roller 36 is assembled with a stirring adapter 231 of the stirring drive component 23. The stirring adapter 231 can be assembled directly or by gears. In this embodiment, the stirring adapter 231 is assembled by gears to drive the stirring rollers 36 to rotate, and another end of the upper stirring roller 36 is assembled with one end of the lower stirring roller 36 by a stirring linkage member 38, so that the upper stirring roller 36 can be controlled to rotate by the stirring drive component 23, and then the upper stirring roller 36 drives the lower stirring roller 36 to rotate. The powder-dispensing roller 37 and a powder-dispensing adapter 241 of the powder-dispensing drive component 24 are assembled with each other. The powder-dispensing adapter 241 can be assembled directly or by gears. In this embodiment, the powder-dispensing adapter 241 is assembled by gears to drive the stirring rollers 36 to rotate. A powder-dispensing port 39 is formed at a bottom of the powder-dispensing cartridge 3, and the powder-dispensing roller 37 is disposed in front of the powder-dispensing port 39. The powder pressing component 27 is disposed at a position of the powder-dispensing port 39. When a drug powder is dispensed, a height of the powder pressing component 27 is higher than a height of the powder-dispensing port 39; when the drug powder is pressed, a height of the powder pressing component 27 is lower than a height of the powder-dispensing port 39.

Figure 5:
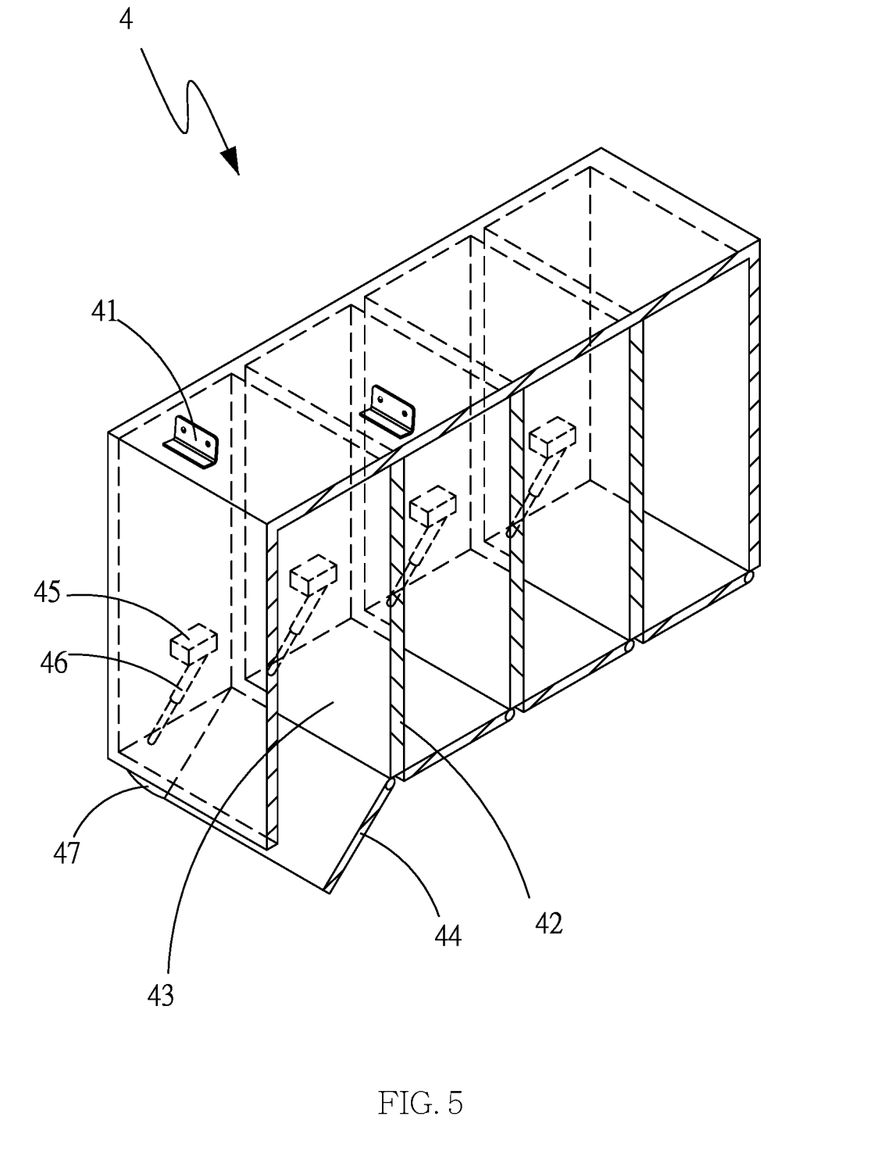
FIG. 5 is a schematic diagram of a powder storage cartridge of the modular drug tablet manufacturing system of the invention.

Please refer to FIG. 5 for a schematic diagram of the powder storage cartridge of the modular drug tablet manufacturing system of the invention, wherein the powder storage cartridge 4 is provided with at least one alignment component 41, and the alignment component 41 can be used for mechanism alignment or can be an infrared ray reflector. A plurality of partitions 42 are disposed inside the powder storage cartridge 4, and a plurality of powder storage spaces 43 are defined inside the powder storage cartridge 4 by the partitions 42. The powder storage cartridge 4 is provided with a stored powder discharge component 44 at a bottom of each of the powder storage spaces 43 respectively, and the stored powder discharge component 44 is disposed at a position of a powder discharge port of the powder storage space 43. The stored powder discharge component 44 can be a gate, a ratchet, or a worm screw, the powder storage cartridge 4 is respectively provided with a stored powder control unit 45 in each of the powder storage spaces 43, and the stored powder control unit 45 is capable of controlling a powder discharge linkage component 46 to open or close a powder discharge port of the powder storage space 43. In this embodiment, the powder storage cartridge 4 is further provided with the powder discharge linkage component 46 in each of the powder storage spaces 43, the powder discharge linkage component 46 is assembled with the stored powder control unit 45, and the powder discharge linkage component 46 is in contact with the stored powder discharge component 44. The stored powder control units 45 respectively drive the powder discharge linkage components 46 to open or close the stored powder discharge components 44. In addition, the powder storage cartridge 4 is further provided with at least one stored powder spacer 47 on a side of the stored powder discharge component 44, and the stored powder spacer 47 is a stored powder baffle.

Wherein, before operation of the modular drug tablet manufacturing system 1, different numbers of the powder-dispensing cartridges 3 can be provided according to composition requirements of different drug tablets, and different drug powder can be disposed in each of the powder-dispensing cartridges 3. The powder-dispensing cartridge 3 can be directly installed on the assembling plate 21 of the machine body 2, the first butting portion 31 is assembled with the first assembling portion 211, the second butting portion 32 is assembled with the second assembling portion 212, and the first butting portion 31 and the first assembling portion 211 as well as the second butting portion 32 and the second assembling portion 212 respectively have position guiding structures. Thereby the powder-dispensing cartridge 3 can be directly installed on the machine body 2 vertically from above, the first butting portion 31 and the first assembling portion 211 as well as the second butting portion 32 and the second assembling portion 212 can be quickly assembled on the machine body 2, and then the pull rod 26 is controlled by the control member 25 to assemble with the butting hole 322, so that the powder-dispensing cartridge 3 can be quickly assembled on the machine body 2, and at the same time, an efficacy of preventing the different drug powder from mixing with one another to affect effects of the drug tablets can be achieved. If the powder-dispensing cartridge 3 needs to be replaced, the control member 25 can be used to control the pull rod 26 to detach from the butting hole 322, and then the powder-dispensing cartridge 3 is directly taken out from between the assembling plates 21. Thereby the different powder-dispensing cartridges 3 can be quickly disassembled and assembled on the machine body 2 to achieve efficacies of quickly disassembling and assembling, replacing the drug powder, and configuring disposition of the powder-dispensing cartridges 3 according to composition requirements, as well as reducing equipment costs and improving a drug tablet production efficiency.

Wherein the powder-dispensing accommodation space 33 of the powder-dispensing cartridge 3 contains the drug powder, different drug powder can be disposed in the powder-dispensing cartridges 3 according to composition requirements of the drug tablets. When the modular drug tablet manufacturing system 1 needs to print with the drug powder, a position of the machine body 2 can be controlled by a control host, the stirring drive component 23 can be controlled by the control host to drive the stirring roller 36 to rotate at a rotation speed in the powder-dispensing accommodation space 33, the control host is further capable of controlling the powder-dispensing drive component 24 to drive the powder-dispensing roller 37 to rotate to dispense the drug powder to reach the powder-dispensing port 39, thereby achieving an efficacy of precisely controlling an amount of powder dispensing of each of the powder-dispensing cartridges 3.

In addition, if the drug powder in the powder-dispensing cartridge 3 on the machine body 2 needs to be replenished, the control host is capable of controlling the machine body 2 to move to reach below the powder storage cartridge 4. Each of the powder storage spaces 43 in the powder storage cartridge 4 is provided with different drug powder, when the control host controls the machine body 2 to move to reach below the powder storage cartridge 4, the powder-dispensing cartridge 3 can be moved to reach below the powder storage space 43 where the drug powder needs to be replenished. Positioning between the machine body 2 and the powder storage cartridge 4 is aligned by the positioning component 22 and the alignment component 41, so that the powder-dispensing cartridge 3 to be replenished with the drug powder can be precisely moved to reach below the powder storage space 43 capable of replenishing the drug powder.

After the powder-dispensing cartridge 3 needed to be replenished with the drug powder moves to reach below the powder storage space 43 capable of replenishing the drug powder, the stored powder discharge component 44 of the powder storage space 43 capable of replenishing the drug powder is attached to the powder-dispensing gate component 34 of the powder-dispensing cartridge 3 needed to be replenished with the drug powder. The control host is capable of controlling the stored powder control unit 45 of the powder storage space 43 capable of replenishing the drug powder, so that the stored powder control unit 45 activates the powder discharge linkage component 46, the powder discharge linkage component 46 slowly pushes the stored powder discharge component 44 to open the stored powder discharge component 44. When the stored powder discharge component 44 opens, the stored powder discharge component 44 simultaneously pushes the powder-dispensing gate component 34. The powder storage space 43 capable of replenishing the drug powder is communicated with the powder-dispensing accommodation space 33 needed to be replenished with the drug powder, and the drug powder in the powder storage space 43 directly dispenses into the powder-dispensing accommodation space 33. In this way, the modular drug tablet manufacturing system 1 is capable of quickly replenishing the drug powder to solve the problem of slow moving speed of printing equipment and poor drug tablet production efficiency caused by the prior art requiring to be provided with enough powder storage space to store a large amount of drug powder, thereby achieving efficacies of reducing equipment costs and improving drug tablet production efficiency.

Wherein when the stored powder control unit 45 activates the powder discharge linkage component 46, and the powder discharge linkage component 46 pushes the stored powder discharge component 44, the stored powder discharge component 44 drives and opens the stored powder baffle simultaneously. Since the stored powder baffle is connected to the powder-dispensing baffle, when the drug powder in the powder storage space 43 dispenses into the powder-dispensing accommodation space 33, dust formed by the dispensing drug powder or the scattered drug powder can be blocked by the stored powder baffle and the powder-dispensing baffle.

Wherein after the drug powder in the powder-dispensing accommodation space 33 is filled, the control host is capable of controlling the stored powder control unit 45 of the powder storage space 43 capable of replenishing the drug powder, so that the stored powder control unit 45 activates the powder discharge linkage component 46, the powder discharge linkage component 46 is capable of pulling back the stored powder discharge component 44, so that the stored powder discharge component 44 returns to an original position and closes the powder storage space 43. When the stored powder discharge component 44 returns to an original position, the powder-dispensing gate component 34 is also capable of returning to an original position by its elastic force and closing the powder-dispensing accommodation space 33.

Figure 6:
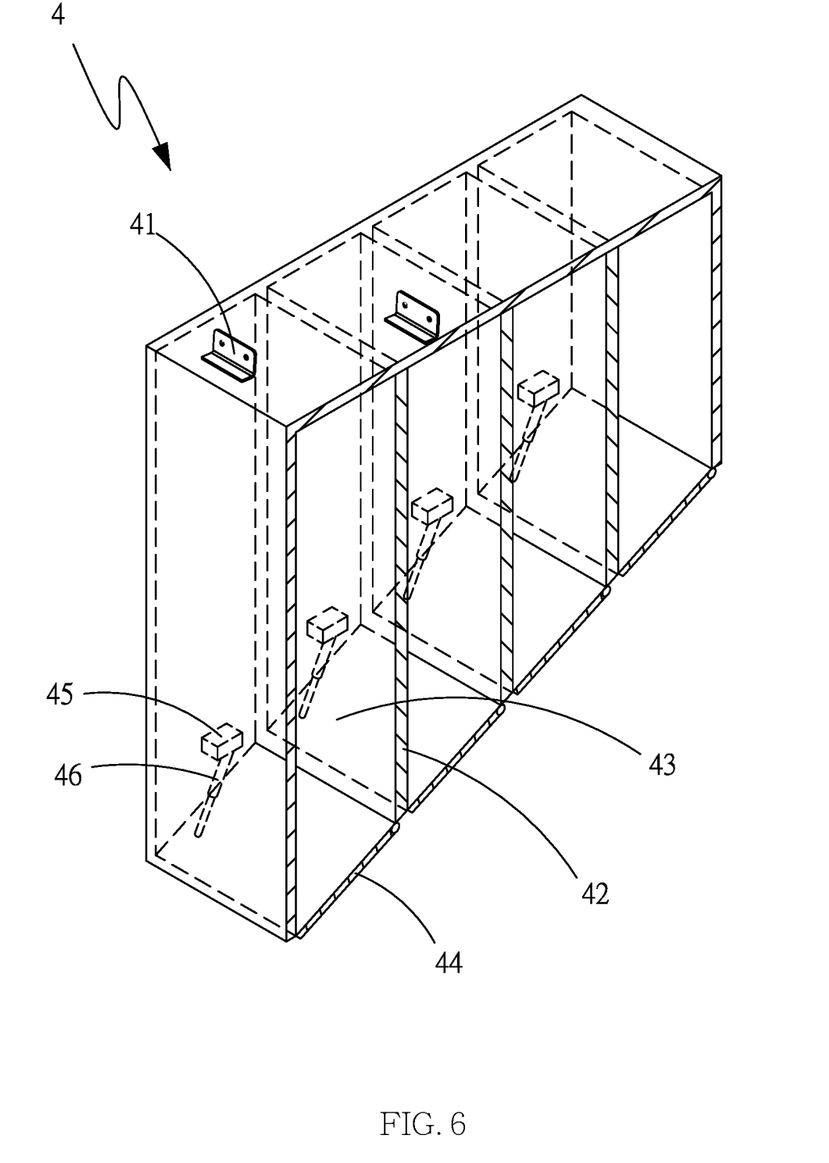
FIG. 6 is another schematic diagram of the powder storage cartridge of the modular drug tablet manufacturing system of the invention.

Please refer to FIG. 6 for another schematic diagram of the powder storage cartridge of the modular drug tablet manufacturing system of the invention, wherein an internal volume of the powder storage space 43 inside the powder storage cartridge 4 gradually decreases sequentially from front to rear, a bottom of the powder storage cartridge 4 forms an inclined surface, a bottom of each of the powder storage spaces 43 is provided with the stored powder discharge component 44, and the stored powder discharge component 44 closes the powder storage space 43, thereby the powder storage space 43 is capable of facilitating dispensing of the drug powder into powder-dispensing accommodation space 33 by virtue of its inclination.

The invention has been described in detail above, but the above description is only preferred embodiments of the invention, and should not limit a scope implemented by the invention, that is, all equivalent changes and modifications made according to the applied scope of the invention should still fall within the scope covered by the appended claims of the invention.

What is claimed is:

1. A modular drug tablet manufacturing system comprising:
   a machine body, the machine body being provided with at least one assembling plate;
   a plurality of powder-dispensing cartridges, and all of the plurality of powder-dispensing cartridges being assembled with the at least one assembling plate, a powder-dispensing accommodation space being formed in each of the powder-dispensing cartridges, and a powder-dispensing port being formed at a bottom of each of the powder-dispensing cartridges; and at least one powder storage cartridge, the at least one powder storage cartridge being assembled with the powder-dispensing cartridge, the powder storage cartridge having a plurality of partitions therein and a plurality of powder storage spaces being divided inside by the partitions, a bottom of each of the powder storage spaces being respectively provided with a stored powder discharge component, all of the powder storage cartridge being provided with a plurality of stored powder control units therein to control the stored powder discharge components respectively, the machine body being capable of driving the powder-dispensing cartridge to move to reach below the powder storage cartridge, and a drug powder in the powder storage spaces being capable of dispensing into the powder-dispensing accommodation spaces of the powder-dispensing cartridges to replenish the drug powder in the powder-dispensing accommodation spaces.

2. The modular drug tablet manufacturing system as claimed in claim 1, wherein at least one powder discharge linkage component is further provided in the powder storage cartridge, and all of the stored powder control units drive the at least one powder discharge linkage components to open or close the stored powder discharge components.

3. The modular drug tablet manufacturing system as claimed in claim 1, wherein the machine body is provided with at least one positioning component, the powder storage cartridge is provided with at least one alignment component, when the machine body drives the powder-dispensing cartridge to move to reach below the powder storage cartridge, the at least one positioning component and the alignment component are capable of positioning with each other, so that the drug powder in all of the powder storage spaces are capable of dispensing into the powder-dispensing accommodation space of the designated powder-dispensing cartridge.

4. The modular drug tablet manufacturing system as claimed in claim 1, wherein at least one first assembling portion is provided on a side of the at least one assembling plate, and at least one first butting portion is provided on a side of the powder-dispensing cartridge to assemble with the first assembling portion.

5. The modular drug tablet manufacturing system as claimed in claim 4, wherein a first guide groove is formed on a side of the first assembling portion, a first guide edge is formed on a side of the first butting portion, and the first guide edge is attached to the first guide groove.

6. The modular drug tablet manufacturing system as claimed in claim 1, wherein at least one second assembling portion is provided on a side of the at least one assembling plate, and at least one second butting portion is provided on a side of the powder-dispensing cartridge to assemble with the second assembling portion.

7. The modular drug tablet manufacturing system as claimed in claim 6, wherein a second guide groove is formed on a side of the second assembling portion, a second guide edge is formed on a side of the second butting portion, the second guide edge is attached to the second guide groove, at least one butting hole is formed on the second butting portion for assembling a pull rod, and the pull rod is controlled by a control member to displace forward and backward and to assemble with or separate from the butting hole.

8. The modular drug tablet manufacturing system as claimed in claim 1, wherein at least one stirring drive component is provided on another side of the at least one assembling plate opposite to the powder-dispensing cartridge, the powder-dispensing cartridge is provided with at least one stirring roller in the powder-dispensing accommodation space, and the at least one stirring roller is assembled with the stirring drive component.

9. The modular drug tablet manufacturing system as claimed in claim 1, wherein at least one powder-dispensing drive component is provided on another side of the assembling plate opposite to the powder-dispensing cartridge, the powder-dispensing cartridge is provided with at least one powder-dispensing roller in the powder-dispensing accommodation space, the at least one powder-dispensing roller is assembled with the powder-dispensing drive component, and the powder-dispensing roller is disposed in front of the powder-dispensing port.

10. The modular drug tablet manufacturing system as claimed in claim 1, wherein the powder storage cartridge is further provided with at least one stored powder spacer on a side of the stored powder discharge component, at least one powder-dispensing gate component is disposed on a top of the powder-dispensing accommodation space of the powder-dispensing cartridge, and a side of the at least one powder-dispensing gate component is further provided with at least one powder-dispensing spacer.

11. The modular drug tablet manufacturing system as claimed in claim 1, wherein a powder pressing component is disposed on a front side of the machine body, and the powder pressing component is disposed at a position of the powder-dispensing port.

* * * * *